(12) United States Patent
Dequen et al.

(10) Patent No.: US 11,108,560 B2
(45) Date of Patent: Aug. 31, 2021

(54) AUTHENTICATION PROTOCOL USING A ONE-TIME PASSWORD

(71) Applicant: Universite De Picardie Jules Verne, Amiens (FR)

(72) Inventors: Gilles Dequen, Amiens (FR); Florian Legendre, Fismes (FR); Gael Le Mahec, Rivery (FR)

(73) Assignee: UNIVERSITE DE PICARDIE JULES VERNE, Amiens (FR)

( * ) Notice: Subject to any disclaimer, the term of this patent is extended or adjusted under 35 U.S.C. 154(b) by 260 days.

(21) Appl. No.: 16/337,506

(22) PCT Filed: Sep. 29, 2017

(86) PCT No.: PCT/EP2017/074815
§ 371 (c)(1),
(2) Date: Mar. 28, 2019

(87) PCT Pub. No.: WO2018/060448
PCT Pub. Date: Apr. 5, 2018

(65) Prior Publication Data
US 2020/0036529 A1    Jan. 30, 2020

(51) Int. Cl.
*H04L 29/06* (2006.01)
*H04L 9/32* (2006.01)
(Continued)

(52) U.S. Cl.
CPC .......... *H04L 9/3236* (2013.01); *H04L 9/0643* (2013.01); *H04L 9/0863* (2013.01);
(Continued)

(58) Field of Classification Search
CPC ..... H04L 9/088; H04L 9/3218; H04L 9/3226; H04L 9/3236; H04L 9/0643; H04L 9/085;
(Continued)

(56) References Cited

U.S. PATENT DOCUMENTS

| 2006/0085845 | A1* | 4/2006 | Davis ...................... G06F 21/31 726/6 |
| 2008/0077795 | A1* | 3/2008 | MacMillan ........... H04L 9/3236 713/169 |

(Continued)

OTHER PUBLICATIONS

International Search Report for PCT/EP2017/074815 dated Oct. 23, 2017 (3 pages).

(Continued)

*Primary Examiner* — Malcolm Cribbs
(74) *Attorney, Agent, or Firm* — Shumaker, Loop & Kendrick, LLP

(57) ABSTRACT

Method of authenticating a client to a server, the client having beforehand registered on the server by storing therein a valid identifier (ID) and a hashed word ($H_0$; $H_n$) generated by applying a hash function to a disposable random variable ($RAND_0$; $RAND_n$; $R_n$) possessed/known by both the client and the server and concatenated with a sequence ($ISC_0$; $ISC_n$) resulting from hashing the concatenation of a password (PWD) known from the client, said disposable random variable ($RAND_0$; $RAND_n$; $R_n$) and an initialization sequence ($ISC_{init}$) possessed by the client.

14 Claims, 9 Drawing Sheets

(51) Int. Cl.
*H04L 9/06* (2006.01)
*H04L 9/08* (2006.01)

(52) U.S. Cl.
CPC ........ *H04L 9/3228* (2013.01); *H04L 2209/20* (2013.01); *H04L 2209/38* (2013.01)

(58) Field of Classification Search
CPC . H04L 9/0863; H04L 9/3228; H04L 2209/20; H04L 2209/38; H04L 63/0815; H04L 9/0869; H04L 9/0891; H04L 9/0894; H04L 63/0435; H04L 63/068; H04L 63/107; G06F 7/588; G06F 7/582; H04W 12/63; H04W 12/068
See application file for complete search history.

(56) References Cited

U.S. PATENT DOCUMENTS

| | | | |
|---|---|---|---|
| 2015/0134947 A1* | 5/2015 | Varcoe | H04L 9/0858 713/150 |
| 2016/0275272 A1* | 9/2016 | Koshinuma | G06F 21/31 |
| 2017/0155634 A1* | 6/2017 | Camenisch | H04L 9/085 |
| 2018/0254904 A1* | 9/2018 | Hwang | H04L 63/0815 |

OTHER PUBLICATIONS

Written Opinion for PCT/EP2017/074815 dated Oct. 23, 2017 (6 pages).

* cited by examiner

STATE OF THE ART

STATE OF THE ART

AUTHENTICATION PROTOCOL USING A ONE-TIME PASSWORD

The present invention relates to methods for authentication using cryptographic hash functions.

Democratization and growth of expanding high-performance digital technologies and of the Internet have considerably changed the world of communication. Needs to preserve trade protection are thus numerous. This can be commonly achieved thanks to secure protocols and hence using cryptographic mechanisms.

Authentication of entities, whether they are persons, objects or services, on information systems can be done either interactively by a human being or in an automatic manner without any human intervention.

When a system needs to identify a client, as for instance for a bank trade, a connection to a website or a system authentication, the main constraint remains focused on the authentication problem, the client having to confirm his/her/its identity to the system in order that the latter can be sure of the client's identity. To ensure this constraint, such systems require the use of cryptographic primitives.

Figure 1A:
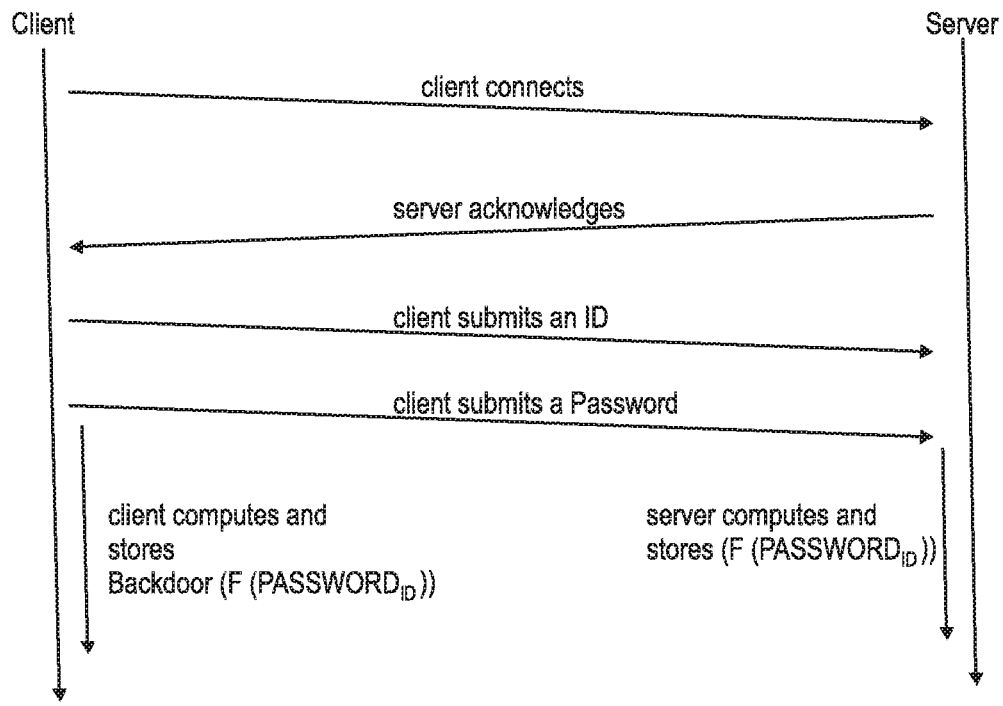

Classically, when an authentication protocol is applied, a client has previously registered an account on a server of the system, preferably information comprising a login ID and a password, the login ID being for example an account name, an e-mail address or a unique identifier, as shown in FIG. 1a. The server can identify the client because the server knows the password. The password is generally not kept as a plaintext on the server. The registration phase includes a cryptographic hashing computation F of the password in order to obtain an associated fingerprint, also named digest, message-digest or hashed data. Thanks to the properties of cryptographic hash functions, this digest is a fixed-size bit string that allows identifying a data without accessing to its contents. This digest is stored on the server and then used to check data integrity each time a password is entered, as shown in FIG. 1b.

Figure 1B:
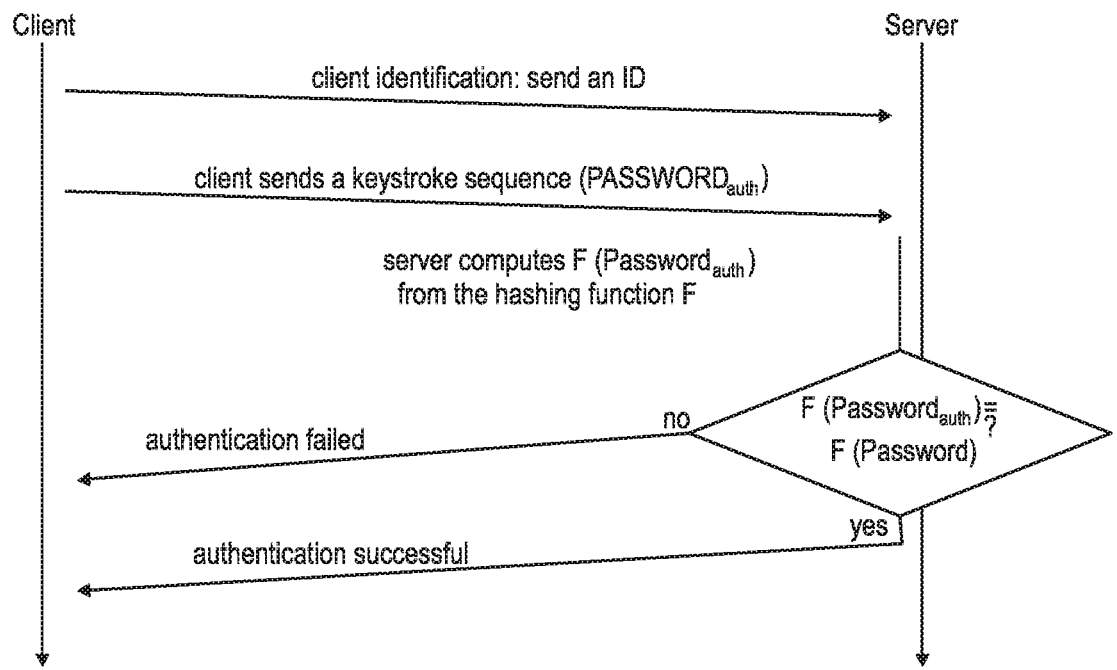

As can be seen in FIGS. 1a and 1b, conventional authentication is based on the client communicating to the server a password in plaintext. This presents several security flaws: the communication channel could be overheard by a malicious attacker or the server could be hacked, so a person with bad intentions could easily get all the client's identification information and steal his/her/its identity. This becomes all the more harmful so since a study has revealed that the majority of online users keep the same password to access to different services they connect to.

To overcome such a security problem, the use of encrypted connections, at least at the client's authentication phase, has been proposed. Although widely used nowadays, the efficiency of this solution remains limited. Indeed, most users still tend to use simple passwords that are easy to remember, but these passwords are considered to be "weak" from a security standpoint, because even cyphered, they are easy to reconstruct. Moreover, end-to-end encryption of communications is not always possible, especially in firms where IT managers want to control all data flows passing on their network. Moreover, using encryption protocols like HTTPS may be incompatible with other security constraints of an information system, especially when it is connected to internet.

Several existing algorithms can eliminate the risk of intercepting passwords such as the SRP (Secure Remote Password) algorithm of which an enhanced version was described in the IEEE article "SRP-6: Improvements and Refinements to the Secure Remote Password Protocol", October 2002, and APAKE (Augmented Password Authenticated Key Exchange) algorithm of which an improved version was proposed in the article "zkPAKE: A simple Augmented PAKE protocol", 2015. The SRP algorithm uses a method similar to the Diffie-Hellman algorithm for the transmission of connection information, rendering inoperative any eavesdropping on communications.

Although the user password is unlikely to be guessed in these authentication protocols, they still have drawbacks like a considerable consumption of resources due to complexity of algebraic computing that involves calculations of exponentials from both sides, client's and server's. These protocols do not manage one-time password authentication, i.e. an authentication in which a password is used for a single connection and is changed for others. Users need to renew their passwords explicitly and the server knows when users changed them.

Thus, there is a need to tackle the abovementioned security challenges and improve authentication protocols.

The present invention proposes to tackle a part or all of these challenges and manages to better authentication methods.

One object of the invention, according to a first of its aspects, is a method of authenticating a client to a server, the client having beforehand registered on the server by storing therein a valid identifier and a hashed word generated by applying a hash function to a disposable random variable possessed/known by both the client and the server and concatenated with a sequence resulting from hashing the concatenation of a password known from the client, said disposable random variable and an initialization sequence possessed by the client, comprising:

a. the client requesting a connection session to the server by transmitting his/her/its identifier;

b. the server checking the existence of the identifier and allowing the client to continue the authentication process;

c. the client transmitting to the server a backhash;

d. the server applying to the concatenation of the hashed word and the backhash an inverse hash function obtained by algebraically solving said hash function;

e. the server comparing the result of the inversion to the random variable it possesses/knows; and f. if there is a match in the comparison of previous step e, authentication is successful for this connection session and the client is allowed to store on the server a new hashed word corresponding to a different random variable and a possibly different password for the next connection session; otherwise, authentication fails.

The terms "possess" and "know" an information are different in that possession, unlike knowledge, implies a storage of that information on a memory.

The backhash is an information allowing to reconstruct, when combined with the hashed word, the plaintext data that was input of said hash function to output said hashed word.

The method according to the invention provides an authentication protocol where the password is never transmitted to the server. The transmitted hashed word is partially dependent on the password that is correlated with a disposable random variable and other sequences by means of concatenation and hashing. This brings several advantages: modification of the password from one connection to another is transparent to the server, password is preserved independently of any database that could be compromised, eavesdropping of client/server exchanges does not engender a risk to thieve the client's identity and in case the disposable random variable is kept secret, use of weak passwords is no longer a security threat.

Besides, thanks to the invention, little computation resources on behalf of the client are required. Complex and time-consuming computation caused by the inversion of the hash function is done on the server's side, but this has the advantage to prevent brute-force attacks that cannot be performed in a reasonable time.

Cryptographic Hash Functions

In a known manner, a cryptographic hash function F computes a hashed word h from an input data m: h=F(m). To one input data m, corresponds only one hashed word h.

No recognizable link exists between the input data m and the hashed word h. Cryptographic hash functions are advantageously non-bijective. Finding a data m by knowing h and doing the inverse operation $F^{-1}(h)$ is nearly impossible. This ensures the high security of hash functions.

A registering/authentication protocol using hash functions may comprise a first step of registration: the password Mclient of the client is hashed, possibly with a given salt, and only the hashed word Hclient=F(Mclient) is stored by the server. Then, when the client needs to be authenticated on the server, he/she enters a sequence M'client. The server computes H'client=F(M'client). If H'client is equal to Hclient, the server authenticates the client and rejects him/her otherwise, as can be shown in FIG. 1b.

To ensure hash functions are secure, they are required to be theoretically and computationally collision, preimage and second-preimage resistant.

A collision is when one can find two messages m and m' such as F(m)=F(m'). This attack is the easiest way to weaken a hash function and supply many tremendous results, as explained in the articles of Xiaoyun Wang "Collisions for hash functions MD4, MD5, haval-128 and ripeMD", in Crypto'04, page 199, 1997, of Xiaoyun Wang and Hongbo Yu "How to break MD5 and other hash functions", in EUROCRYPT, pages 19-35, 2005, of Hongbo Yu and Xiaoyun Wang, "Multi-collision attack on the compression functions of MD4 and 3-pass haval", in ICISC, pages 206-226, 2007, of Christophe De Canniére et al. "Collisions for 70-step SHA-1: On the full cost of collision search", in Selected Areas in Cryptography, pages 56-73, 2007, of Somitra Kumar Sanadhya and Palash Sarkar, "New collision attacks against up to 24-step SHA-2", in INDOCRYPT, pages 91-103, 2008, and of Marc Stevens et al. "Chosen prefix collisions for MD5 and applications", IJACT, 2(4): 322-359, 2012.

A preimage attack consists in, given a hash function F and a hashed word h, finding a message m such as F(m)=h.

In the following, the term "capacity" has to be understood as the number of bits of a bit string.

SHA-3

The hash function is preferably a SHA-3 hash function, especially using the Keccak algorithm. The invention may however be adapted to any cryptographic hash function.

The SHA-3 hash function, using the Keccak algorithm, belongs to the family of sponge functions, that is to say functions that take as input an any-size data and deliver a fixed-size word, as explained in the articles of Guido Bertoni et al. "Sponge functions", in Ecrypt Hash Workshop 2007, "The keccak reference", January 2011, and "Keccak", in EUROCRYPT, pages 313-314, 2013. The bit string used for being concatenated with the input data in order to reach the capacity of the SHA-3 permutation needed to compute a hashed word with the desired final capacity is named the sponge. Sponge functions advantageously incorporates a one-way compression function, which consists, within the framework of Keccak, in considering a fixed-size word of the shortened final state. More generally, a one-way compression function is a function that transforms two fixed-length inputs into a fixed-length output. This type of mechanism is a part of the classical Merkel-Damgard construction. Thus, each cryptographic hash function is consequently correlated to a one-way compression function.

The Keccak algorithm may be implemented from 12 to 24 rounds, with an internal state capacity equal to 200, 400, 800 or 1600.

Figure 2:
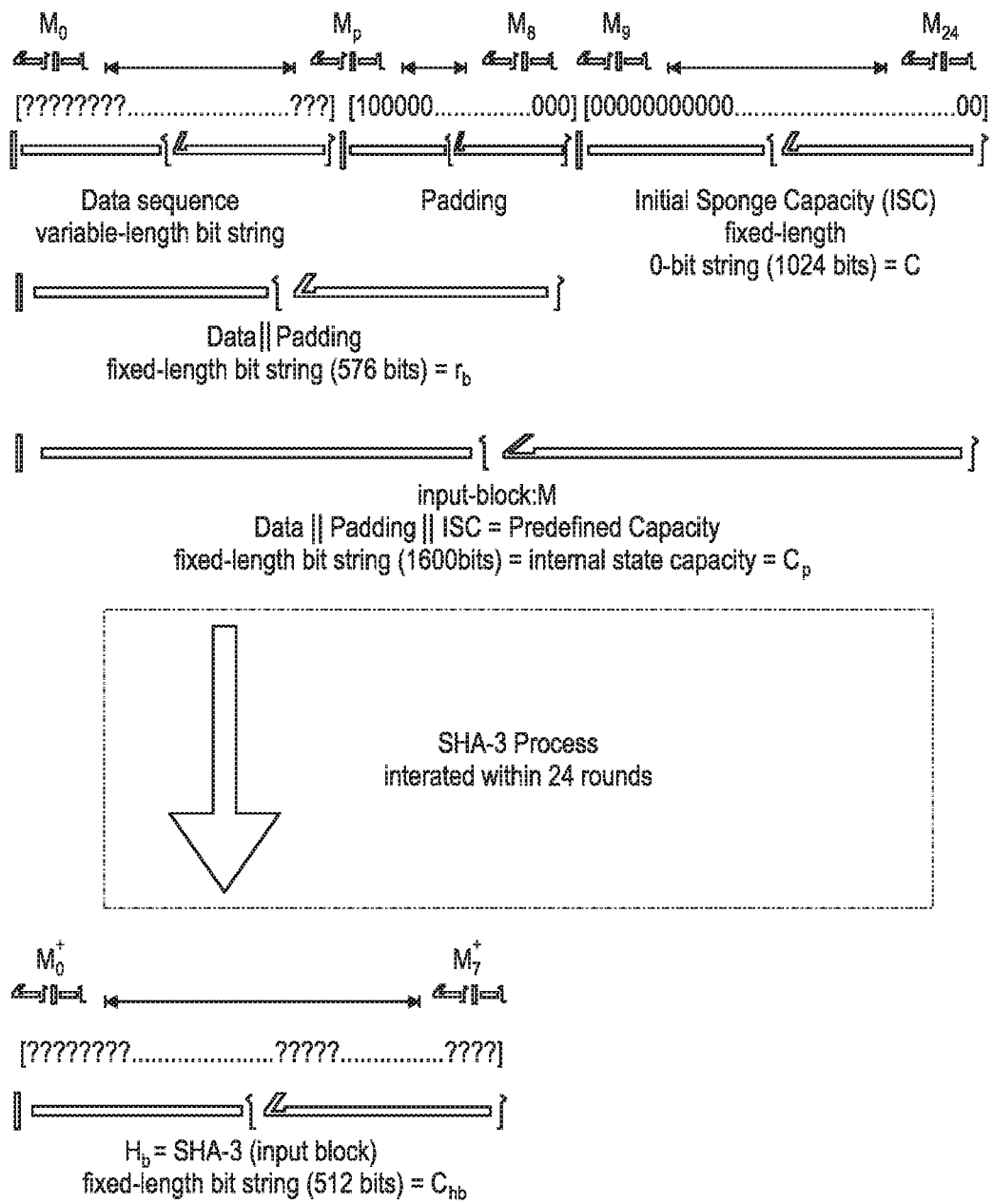

In SHA-3, a trade-off between the values of the bitrate $r_b$ and the capacity c of the sponge determines the security of the hash function against preimage and collision attacks. The internal state capacity of the SHA-3 permutation is defined by the sum of the bitrate $r_b$ and the capacity c of the sponge. The SHA-3 permutation has for example an internal state capacity of 1600 bits, including 64-bit words for internal states, corresponding to the predefined capacity $C_p=r_b+c$, with $r_b=576$ and c=1024, as illustrated in FIG. 2 for a Data sequence, concatenated with one or several bits, named "padding" word, in order to reach the bitrate $r_b$. The complete permutation function advantageously consists in 24 rounds of 5 sub-functions, containing only operations limited to bitwise XOR, bitwise AND, operator NOT and Modulo. A detailed description of a single round, with 64-bit words for internal states, may be:

---

64-bit words for internal states
25 internal states at the beginning of the Round (i.e. [plaintext || padding || ISC] at the first round)
for xx in {00, . . . , 24} and for i in {0, . . . , 63}. Denoted $M_{xx}[i]$
25 internal states at the end of the round (i.e. [digest || PSC] at the final round)
for xx in {00, . . . , 24} and for i in {0, . . . , 63}. Denoted $M_{zz}^+[i]$
25 intermediate states of the round
for xx in {00, . . . , 24} and for i in {0, . . . , 63}. Denoted $T_{xx}[i]$
24 rounds at most (one round described here)
24 Iota Constants 64-bits words (denoted X[r] where 'r' is the round number):
(note: big endianness notation)
X[00]: 0 × 0000000000000001, X[01]: 0 × 0000000000008082, X[02]: 0 × 800000000000808A, X[03]: 0 × 0000000080008000,
X[04]: 0 × 000000000000808B, X[05]: 0 × 0000000080000001, X[06]: 0 × 8000000080008081, X[07]: 0 × 8000000000008009,
X[08]: 0 × 000000000000008A, X[09]: 0 × 0000000000000088, X[10]: 0 × 0000000080008009, X[11]: 0 × 000000008000000A,
X[12]: 0 × 000000008000808B, X[13]: 0 × 800000000000008B, X[14]: 0 × 8000000000008089, X[15]: 0 × 8000000000008003,
X[16]: 0 × 8000000000008002, X[17]: 0 × 8000000000000080, X[18]: 0 × 000000000000800A, X[19]: 0 × 800000008000000A,
X[20]: 0 × 8000000080008081, X[21]: 0 × 8000000000008080, X[22]: 0 × 0000000080000001, X[23]: 0 × 8000000080008008
XOR gate is ⊕
Not x is $\bar{x}$
AND gate is ∧
OR Gate is ∨

-continued

Modulo is %

| | Internal State Matrix Indexes (Denoted ISM) | Middle State Matrix Indexes, (Denoted MSM) | Middle State Shifting offsets, (Denoted MSS) |
|---|---|---|---|
| [00] | [0, 4, 9, 14, 19, 24, 1, 6, 11, 16, 21] | [0, 6, 12] | [0, 44, 43] |
| [01] | [1, 0, 5, 10, 15, 20, 2, 7, 12, 17, 22] | [6, 12, 18] | [44, 43, 21] |
| [02] | [2, 1, 6, 11, 16, 21, 3, 8, 13, 18, 23] | [12, 18, 24] | [43, 21, 14] |
| [03] | [3, 2, 7, 12, 17, 22, 4, 9, 14, 19, 24] | [18, 24, 0] | [21, 14, 0] |
| [04] | [4, 3, 8, 13, 18, 23, 0, 5, 10, 15, 20] | [24, 0, 6] | [14, 0, 44] |
| [05] | [5, 4, 9, 14, 19, 24, 1, 6, 11, 16, 21] | [3, 9, 10] | [28, 20, 3] |
| [06] | [6, 0, 5, 10, 15, 20, 2, 7, 12, 17, 22] | [9, 10, 16] | [20, 3, 45] |
| [07] | [7, 1, 6, 11, 16, 21, 3, 8, 13, 18, 23] | [10, 16, 22] | [3, 45, 61] |
| [08] | [8, 2, 7, 12, 17, 22, 4, 9, 14, 19, 24] | [16, 22, 3] | [45, 61, 28] |
| [09] | [9, 3, 8, 13, 18, 23, 0, 5, 10, 15, 20] | [22, 3, 9] | [61, 28, 20] |
| [10] | [10, 4, 9, 14, 19, 24, 1, 6, 11, 16, 21] | [1, 7, 13] | [1, 6, 25] |
| [11] | [11, 0, 5, 10, 15, 20, 2, 7, 12, 17, 22] | [7, 13, 19] | [6, 25, 8] |
| [12] | [12, 1, 6, 11, 16, 21, 3, 8, 13, 18, 23] | [13, 19, 20] | [25, 8, 18] |
| [13] | [13, 2, 7, 12, 17, 22, 4, 9, 14, 19, 24] | [19, 20, 1] | [8, 18, 1] |
| [14] | [14, 3, 8, 13, 18, 23, 0, 5, 10, 15, 20] | [20, 1, 7] | [18, 1, 6] |
| [15] | [15, 4, 9, 14, 19, 24, 1, 6, 11, 16, 21] | [4, 5, 11] | [27, 36, 10] |
| [16] | [16, 0, 5, 10, 15, 20, 2, 7, 12, 17, 22] | [5, 11, 17] | [36, 10, 15] |
| [17] | [17, 1, 6, 11, 16, 21, 3, 8, 13, 18, 23] | [11, 17, 23] | [10, 15, 56] |
| [18] | [18, 2, 7, 12, 17, 22, 4, 9, 14, 19, 24] | [17, 23, 4] | [15, 56, 27] |
| [19] | [19, 3, 8, 13, 18, 23, 0, 5, 10, 15, 20] | [23, 4, 5] | [56, 27, 36] |
| [20] | [20, 4, 9, 14, 19, 24, 1, 6, 11, 16, 21] | [2, 8, 14] | [62, 55, 39] |
| [21] | [21, 0, 5, 10, 15, 20, 2, 7, 12, 17, 22] | [8, 14, 15] | [55, 39, 41] |
| [22] | [22, 1, 6, 11, 16, 21, 1, 8, 13, 18, 23] | [14, 15, 21] | [39, 41, 2] |
| [23] | [23, 2, 7, 12, 17, 22, 4, 9, 14, 19, 24] | [15, 21, 2] | [41, 2, 62] |
| [24] | [24, 3, 8, 13, 18, 23, 0, 5, 10, 15, 20] | [21, 2, 8] | [2, 62, 55] |

STEP 1: Compute intermediate internal state $T_{xx}[i]$ $$\forall i \in [0,63], \forall xx \in [0,24], T_{xx}[i] = \bigoplus_{j=0}^{5} M_{ISM[xx][j]}[i] \oplus \bigoplus_{j=6}^{10} M_{ISM[xx][j]}[(i-1)\%64]$$

STEP 2: Compute internal states at the end of the round $M_{xx}^{+}[i]$
$\forall i \in [0,63], M_{00}^{+}[i] = T_0[i] \oplus (\overline{T_6[(i-44)\%64]} \wedge T_{12}[(i-43)\%64]) \oplus X_r$
$\forall i \in [0,63], \forall xx \in [1,24], M_{xx}^{+}[i] = T_{A_0}[(i-B_0)\%64] \oplus (\overline{T_{A_1}[(i-B_1)\%64]} \wedge T_{A_2}[(i-B_2)\%64])$
where $A_y = MSM[xx][y]$ and $B_y = MSS[xx][y]$ At the end of the final round, only the first n bits of the internal state are considered as the digest, this number of bits n depending on the bitrate $r_b$ and the capacity c of the sponge, n being equal for example to 512 in the case where $r_b$=576 and c=1024. A particularity of SHA-3 is that the hash function is easily invertible from an internal state if all the bits are known, thanks to any procedure of polynomial complexity.

Algebraic Solving of Cryptographic Hash Functions

The algebraic solving of the hash function having generated the hashed word allows inverting said hash function and retrieving the original data. This can be done thanks to a Boolean encoding of the hash function primitive and a dedicated or generic algebraic solver.

The algebraic solving of the hash function is advantageously a Boolean SATisfiability (SAT) solving. This type of constraint-problem solving is a well-known NP-complete problem, as described in the articles of A. Biere et al. "Handbook of Satisfiability", volume 185 of Frontiers in Artificial Intelligence and Applications, IOS Press, February 2009, and of Stephen A. Cook "The complexity of theorem proving procedures", in ACM Symposium on Theory of Computing, pages 151-158, 1971.

SATisfiability solving consists in determining if a Boolean expression F has at least one assignment of truth value {TRUE, FALSE}, also named an interpretation, to its variable so that it is true. F is preferably considered as a CNF-formula ("Conjunctive Normal Form") which can be defined as a set of clauses, interpreted as a conjunction, where a clause is a set of literals, interpreted as a disjunction.

More precisely, let $v=\{v_1, \ldots v_n\}$ be a set of n Boolean variables. A signed Boolean variable is named a literal. One can denote $v_i$ and $\overline{v_i}$ the positive and negative literals referring to the variable $v_i$, respectively. The literal $v_i$, respectively $\overline{v_i}$ is TRUE, also said "satisfied", if the corresponding variable $v_i$ is assigned to TRUE, respectively FALSE. Literals are commonly associated with logical AND and OR operators, respectively denoted by $\wedge$ and $\vee$. A disjunction of literals is for instance denoted by $v_1 \vee \overline{v_2} \vee v_3 \vee v_4$.

A clause is generally satisfied if at least one of its literals is satisfied, the expression F being satisfied if all its clauses are satisfied. In other words, if its exists an assignment of V on {TRUE, FALSE} such as to make the expression F TRUE, F is said SAT, and UNSAT otherwise.

Logical cryptanalysis consists in a two-step process using a modelling associated to an algebraic solving to model and. This can lead to the attack of a crypto-system, as explained in the articles of Fabio Massacci "Using walk-SAT and rel-sat for cryptographic key search", in IJCAI, pages 290-295, 1999, and of Fabio Massacci and Laura Marraro "Logical cryptanalysis as a SAT problem", J.Autom.Reasoning, pages 165-203, 2000, in the three articles of Florian Legendre et al. "Encoding hash functions as a SAT problem", in ICTAI, pages 916-921, 2012, "Inverting thanks to SAT solving—an application on reduced-step MD*", in SECRYPT, pages 339-344, 2012, and "From a logical approach to internal states of hash functions—how SAT problem can help to understand SHA-* and MD*"; in SECRYPT, 2013, and in the Master thesis of Vegard Nossum "SAT-based preimage attacks on SHA-1", 2012.

The article of Ilya Mironov and Lintao Zhang "Applications of SAT solvers to cryptanalysis of hash functions", in SAT, pages 102-115, 2006, presents an interesting result on applying logical cryptanalysis to cryptographic hash functions. In this article, the authors assume that the runtime of a cryptanalytic attack should be improved by using a logic formalism to express complex operations. They model a whole differential path for the well-known hash functions MD-* and SHA-*, into a Boolean circuit and obtain conclusive results by using some of well-known SAT solvers.

SATisfiability Solving of SHA-3

Modeling a hash function as a SAT formula may be realized thanks to automatic tools, as for instance CryptLogVer described in the article of Pawel Morawiecki and Marian Srebrny "A SAT-based preimage analysis of reduced Keccak hash functions", in Inf. Process. Letters, 113(10-11):392-397, 2013, or by a handmade approach. Using a handmade approach allows obtaining an optimized resulting modeling, in terms of number of clauses and variables involved.

Encoding the SHA-3 hash function as a SAT formula advantageously requires considering each bit of each word involved into the original primitive as a variable. Each internal operation, also corresponding to a logical circuit, is associated to a set of clauses.

A direct SATisfiability solving of the Keccak hash function for a single round, with 64-bit words for internal states, may be expressed as:

$$\forall i \in [0, 63] \bigwedge_{xx=0}^{24} \left( \bigoplus_{j=0}^{5} M_{ISM[xx][j]}[i] \oplus \bigoplus_{j=6}^{10} M_{ISM[xx][j]}[(i-1)\%64] \oplus \overline{T_{xx}[i]} \right)$$

$$\forall i \in [0, 63] \wedge \left( T_{00}[i] \oplus E_{00}[i] \oplus \overline{M_{00}^+[i]} \oplus X_r[i] \right)$$

$$\forall i \in [0, 63] \bigwedge_{xx=0}^{24} \left( T_{MSM[xx][0]}[(i-MSS[xx][0])\%64] \oplus E_{xx}[i] \oplus \overline{M_{xx}^+[i]} \right)$$

$$\forall i \in [0, 63] \bigwedge_{xx=0}^{24} (T_{MSM[xx][1]}[(i-MSS[xx][1])\%64] \vee$$

$$T_{MSM(xx)[2]}[(i-MSS[xx][2])\%64] \vee E_{xx}[i])$$

$$\forall i \in [0, 63] \bigwedge_{xx=0}^{24} (\overline{T_{MSM[xx][1]}[(i-MSS[xx][1])\%64]} \vee \overline{E_{xx}[i]})$$

$$\forall i \in [0, 63] \bigwedge_{xx=0}^{24} (\overline{T_{MSM[xx][2]}[(i-MSS[xx][2])\%64]} \vee \overline{E_{xx}[i]})$$

with the 25 internal states denoted $M_{xx}[i]$, $T_{xx}[i]$ an intermediate 64-bit word named "Theta", $E_{xx}[i]$ a 64-bit word named "equivalency", and r the round number.

The SAT encoding of the SHA-3 hash function according to the invention may comprise 869 120 clauses and 92 160 variables. These values may vary according to the implemented encoding technique.

More Features of the Authentication Method

The backhash information, also called security key, is preferably obtained by a modified hash function configured to conserve all the bits of the last internal state computed from the input data of said hash function.

Actually, the hash function HF is advantageously modified to form the hash function HF*, configured to conserve all the bits of the last internal state computed from the data to be preserved as input of the hash function HF, and divide it into two parts, preferably by ignoring the compression function correlated to said hash function HF. Preferably, the hashed word corresponds to a 512-least significant bits vector of a 1600-bits internal state, and the security key corresponds to a 1088-least significant bits vector of a 1600-bits internal state.

The modified hash function HF* is configured to preserve all the standard specifications of hash function HF, but is also configured to compute any extra information that can lead to a security key allowing to reconstruct the plaintext data when combined with the hashed word computed by hash function HF.

Figure 3:
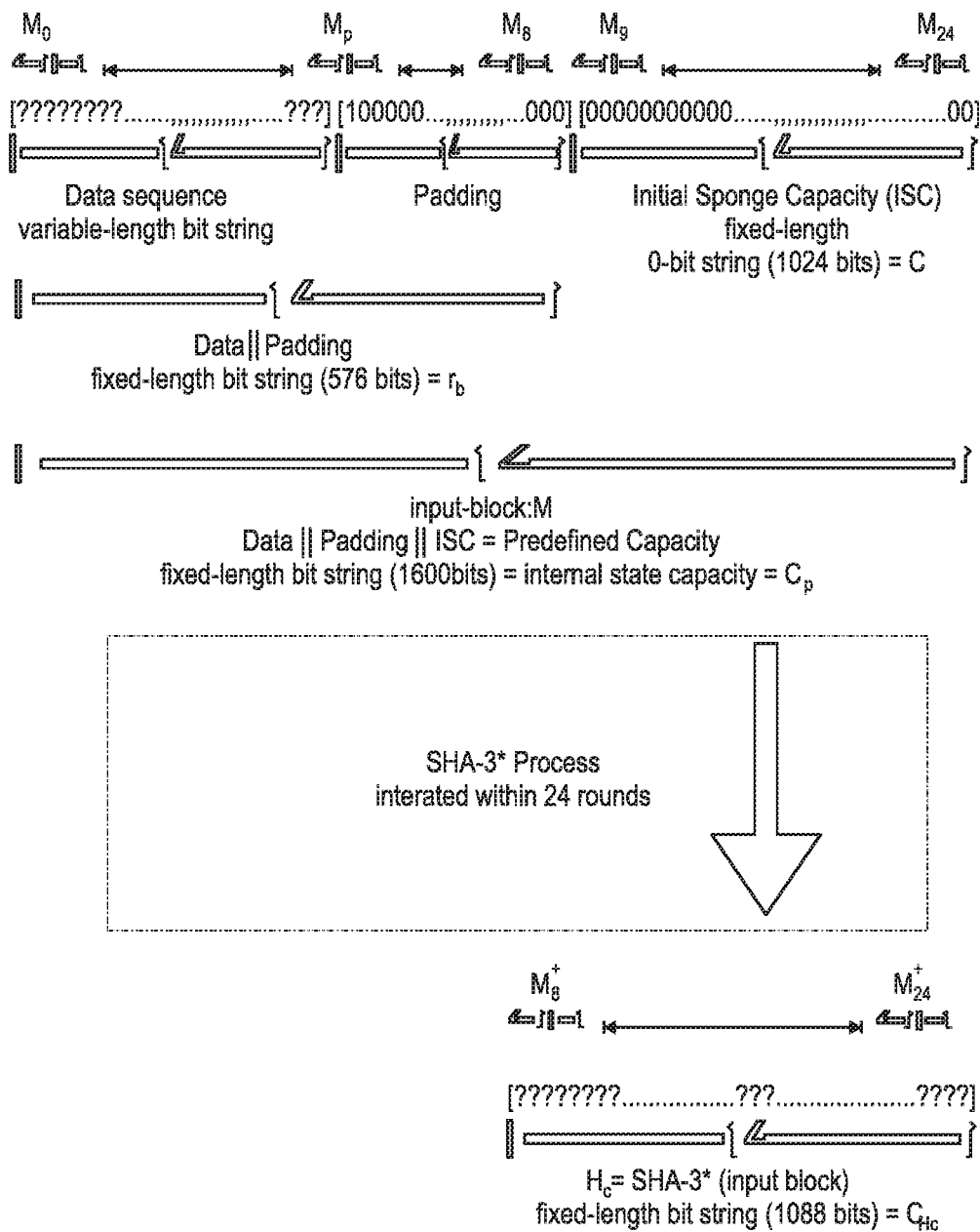

The generation of the security key $H_c$, illustrated in FIG. 3 for an internal state capacity of 1600 bits, may be expressed as:

$H_c$=HF*(Data||Padding||ISC).

The capacity $C_{hc}$ of the security key $H_c$, also named the final sponge capacity, is equal to the difference between the predefined capacity $C_p$ and the capacity $C_{hb}$ of the hashed word $H_b$: $C_{hc}=C_p-C_{hb}$.

The sequence ISC, also called initial sponge, may be randomly sampled, comprising for example only bits equal to 0.

In addition to being concatenated with such a sequence, the disposable random variable may be concatenated with a padding word in order to reach a predefined capacity of input data of the hash function.

Likewise, in addition to being concatenated with the initialization sequence and the disposable random variable, the password may be concatenated with a padding word in order to reach a predefined capacity of input data of the hash function.

Preferably, a padding word is a bit stream comprising a one followed by zeros.

The disposable random variable is regarded as a nonce word which is intended for a single usage, i.e., it is meant to be used for one connection solely, especially in order to prevent replay attacks.

The client and the server may exchange the disposable random variable in plaintext.

Another alternative may be that a dedicated trustworthy server generates the disposable random variable and transmits it to the client and the server.

A third alternative could be that the disposable random variable is generated by a specific device owned by both the client and the server. It could be either a hardware or a software token.

A fourth alternative may consist in generating the disposable random variable for a current connection from the backhash of the immediately previous connection.

Keeping track of the random variable between two connections at the client's or the generating device permits detection of identity theft.

As regard to the alternative where the random variable is generated from the backhash, since it is possible to know the exact number of connections since registration, the client can check if an undue connection occurred since his/her/its last legitimate connection. Indeed, the entire chain of successive connections can be reconstructed, hence leading to the last backhash used.

Moreover, when the disposable random variable is generated from the backhash, in addition to being concatenated with said sequence, the disposable random variable may be concatenated with a short data. In this case, the method according to the invention may further comprise the following steps:

if there is a match in the comparison of step e, the client's identity and the short data are validated by the server which computes from the backhash the next disposable random variable and sends its hashed value to the client;

the client computes the same way the next disposable random variable and compares its hashed value to the one received by the server;

if there is a match in the comparison of previous step, the server is authenticated to the client, otherwise authentication fails;

if the server's authentication is successful, the client can store on the server a new hashed word corresponding to the next disposable random variable and a possibly different password for the next connection session;

the server hashes the concatenation of the next random variable and the corresponding hashed word, and sends it to the client;

the client performs the same hashing operation and compares the obtained result with that sent by the server; and if there is a match in the comparison of previous step, the client validates storing of the new hashed word by the server.

These supplementary steps allow to authenticate the server to the client, and constitute a shield against Man in the Middle attacks.

A variant of the invention may be that the disposable random variable is unknown to the server. In this case, the server should know the initial sponge value to be able to perform comparison at step e, on the basis of known ISC.

Preferably, more than one server may be involved in the authentication process. More precisely, step d may be performed on at least two servers, each of them partially carrying out algebraic solving of the hash function. Actually, the inversion operation could be divided in sub-operations executed by these servers. The more servers are involved, the more difficult hacking all of them becomes.

Likewise, the hashed word may be stored on several servers. The more different actors the consensus «server(s)+client» involves, the better the security.

Preferably, in each exchange between client and server, both parties or at least one of them may transmit a timestamp that is checked by the other party to verify synchronization and obviate replay attacks.

Computer Program Products

Another object of the invention, according to another of its aspects, is a computer program product comprising instructions that can be read by a client, these instructions controlling the client's authentication to a server on which is stored a valid identifier for the client and a hashed word generated by applying a hash function to a disposable random variable possessed/known by both the client and the server and concatenated with a sequence resulting from hashing the concatenation of a password known from the client, said disposable random variable and an initialization sequence possessed by the client, said instructions comprising:

requesting a connection session to the server by transmitting the identifier and waiting for the server's acknowledgment;

transmitting to the server a backhash; and if authentication is allowed for this connection session, having the possibility to store on the server a new hashed word corresponding to a different random variable and a possibly different password for the next connection session.

Another object of the invention, according to another of its aspects, is also a computer program product comprising instructions that can be read by a server, these instructions controlling a client's authentication to the server on which is stored a valid identifier for the client and a hashed word generated by applying a hash function to a disposable random variable possessed/known by both the client and the server and concatenated with a sequence resulting from hashing the concatenation of a password known from the client, said disposable random variable and an initialization sequence possessed by the client, said instructions comprising:

allowing a connection session to the client if the right identifier is transmitted by the client after his/her/its connection request;

waiting to receive from the client a backhash;

applying the concatenation of the hashed word and the backhash to an inverse hash function obtained by algebraically solving said hash function;

comparing the result of the inversion to the random variable possessed/known by the server; and if comparison matches allowing authentication for this connection session, and allowing to store a new hashed word corresponding to a different random variable for the next connection session; otherwise rejecting authentication.

Another object of the invention, according to another of its aspects, is as well a computer program product comprising instructions that can be read by both a client and a server, these instructions controlling the client's authentication to the server on which is stored a valid identifier and a hashed word generated by applying a hash function to a disposable random variable possessed/known by both the client and the server and concatenated with a sequence resulting from hashing the concatenation of a password known from the client, said disposable random variable and an initialization sequence possessed by the client, said instructions comprising:

a. the client requesting a connection session to the server by transmitting his/her/its identifier;

b. the server checking the existence of the identifier and allowing the client to continue the authentication process;

c. the client transmitting to the server a backhash;

d. the server applying to the concatenation of the hashed word and the backhash an inverse hash function obtained by algebraically solving said hash function;

e. the server comparing the result of the inversion to the random variable it possesses/knows; and f. if there is a match in the comparison of previous step e, authentication is successful for this connection session and the client is allowed to store on the server a new hashed word corresponding to a different random variable and a possibly different password for the next connection session; otherwise, authentication fails.

All features defined here above for the method of authentication apply to all three computer program products, objects of the invention.

DETAILED DESCRIPTION OF FIGURES

Figure 4:
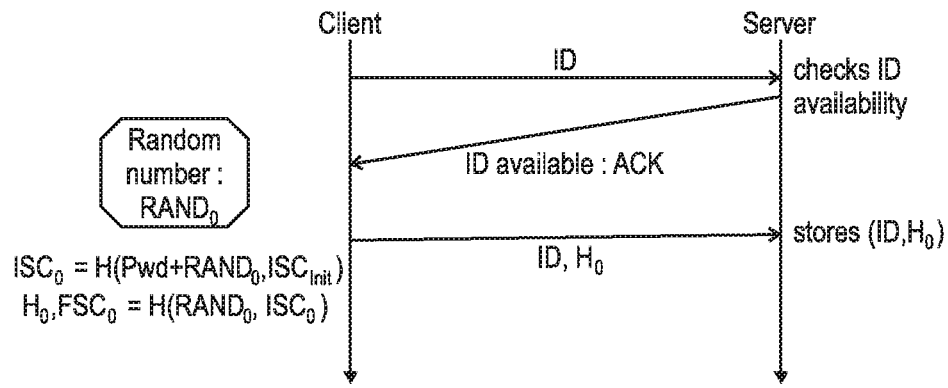
Figure 5:
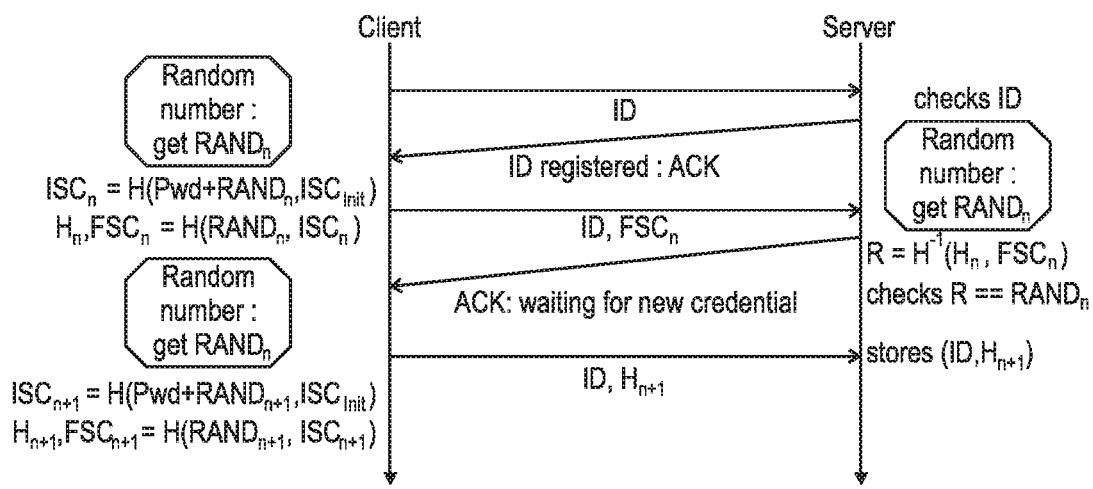
Figure 6:
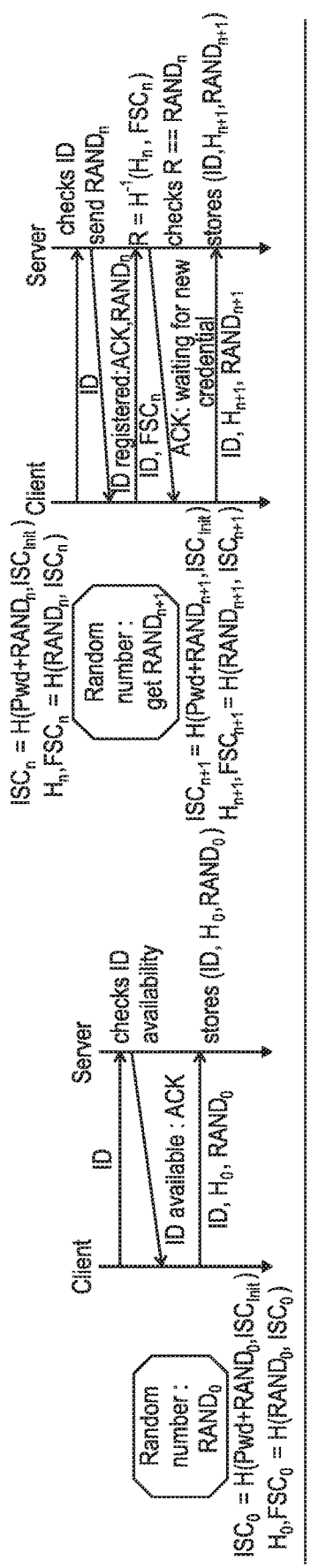
Figure 7A:
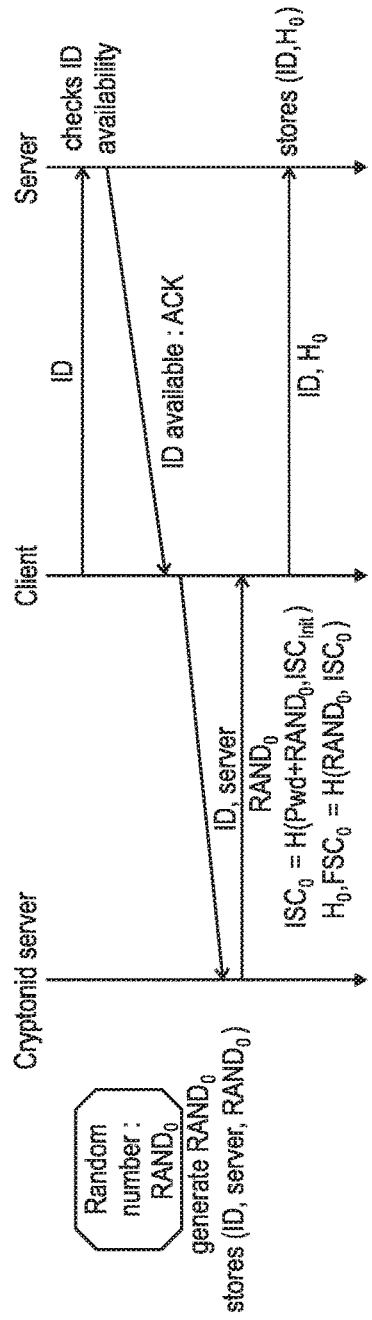
Figure 7B:
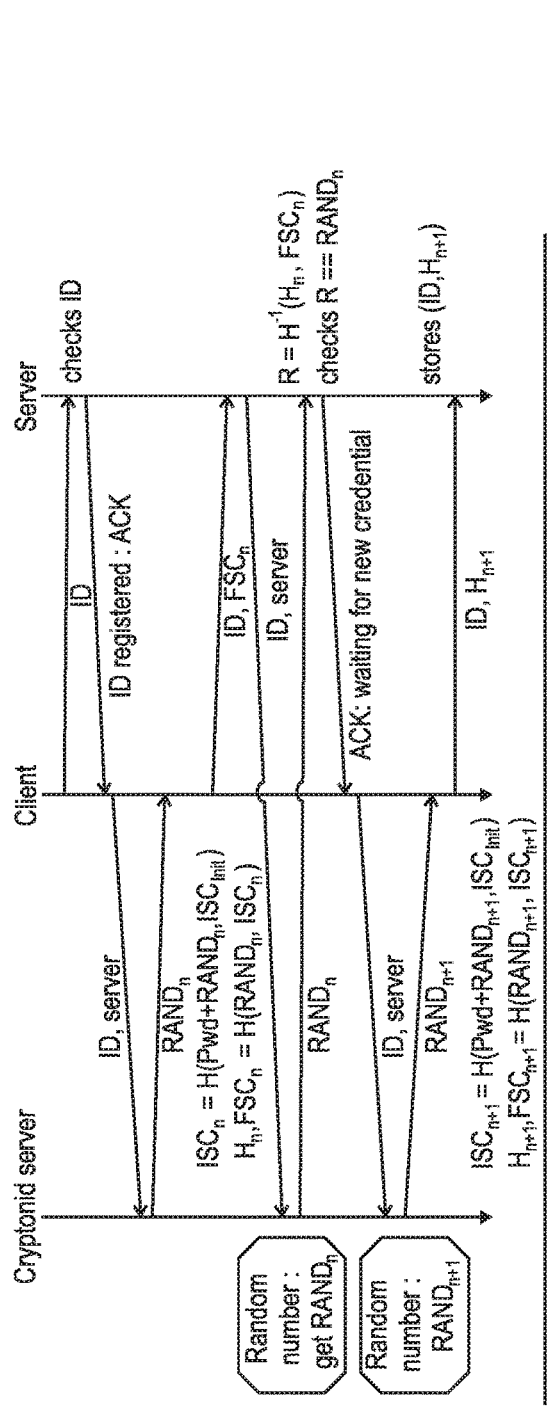
Figure 8:
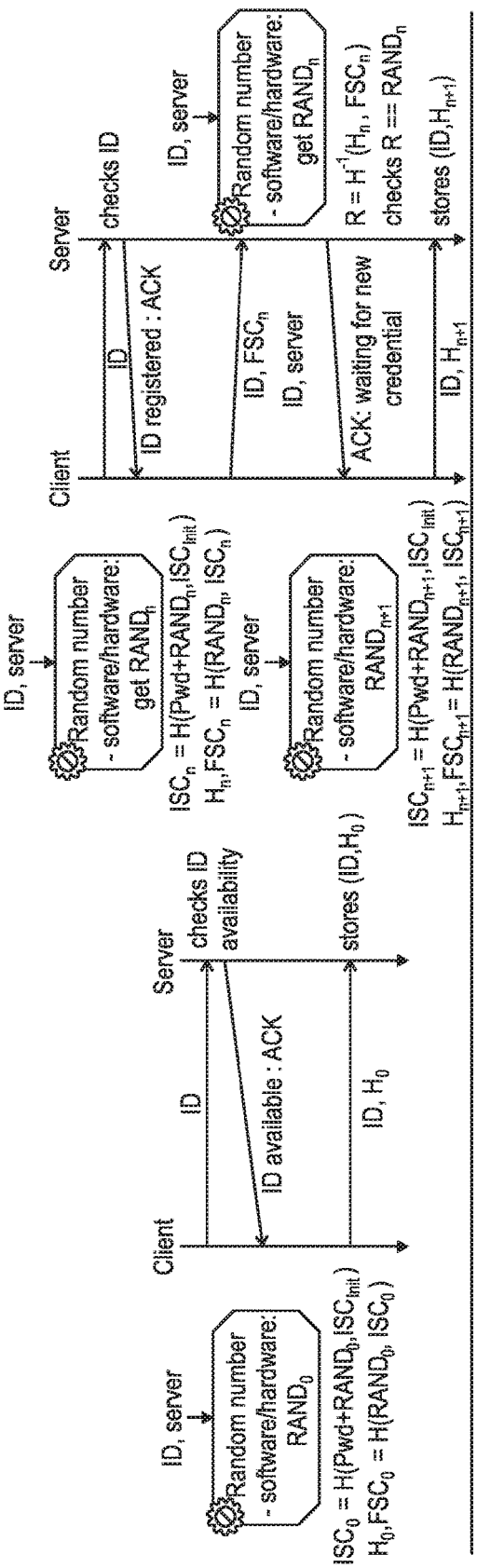
Figure 9:
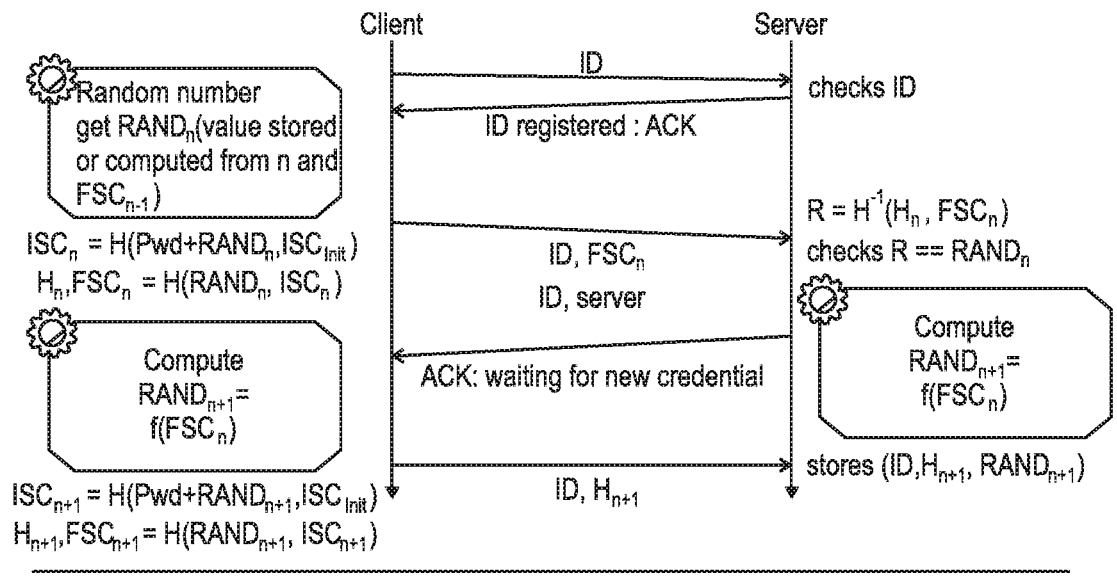
Figure 10:
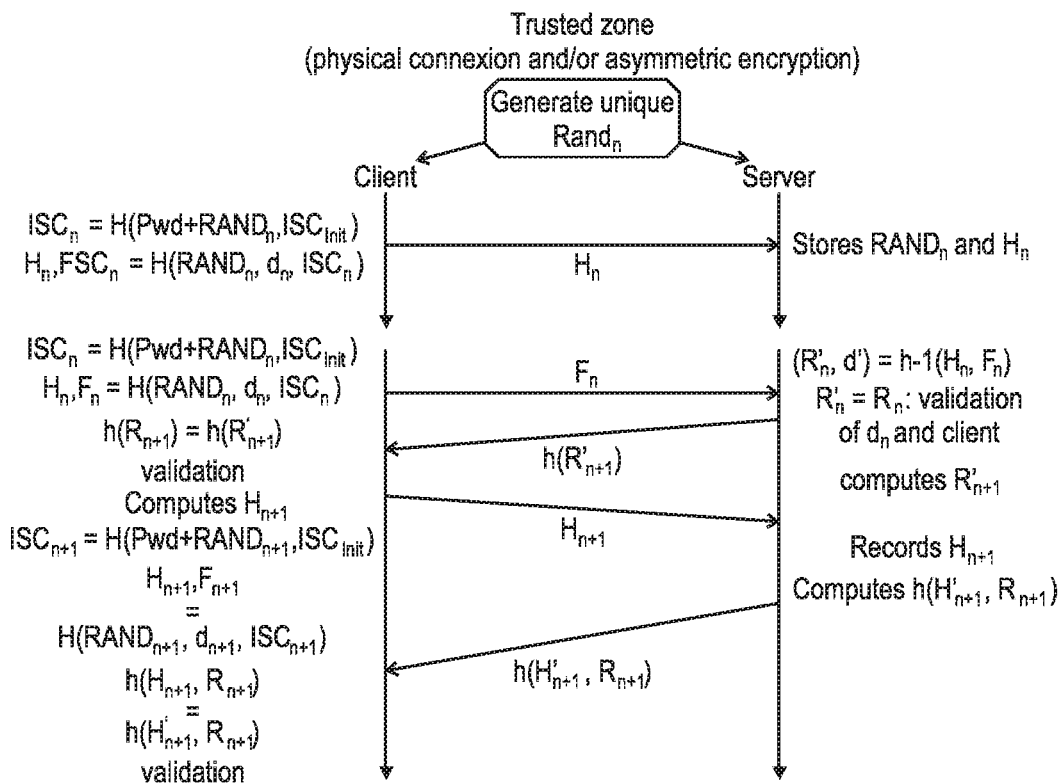
Figure 11:
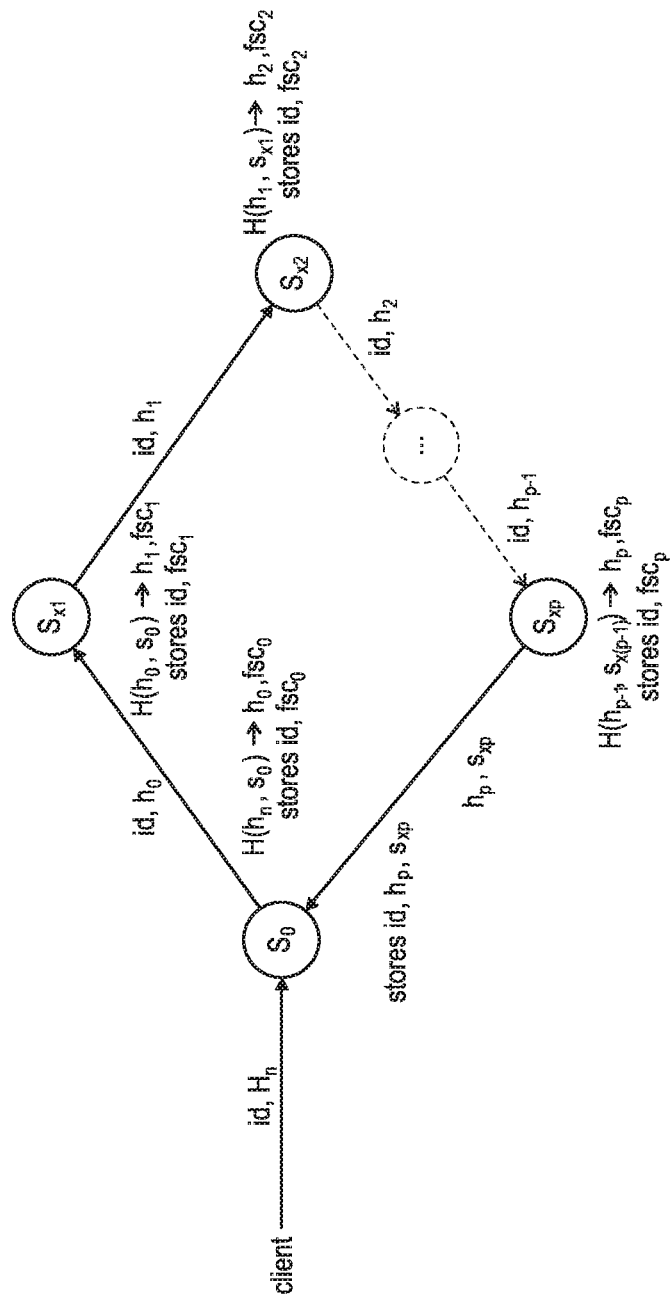
Figure 12:
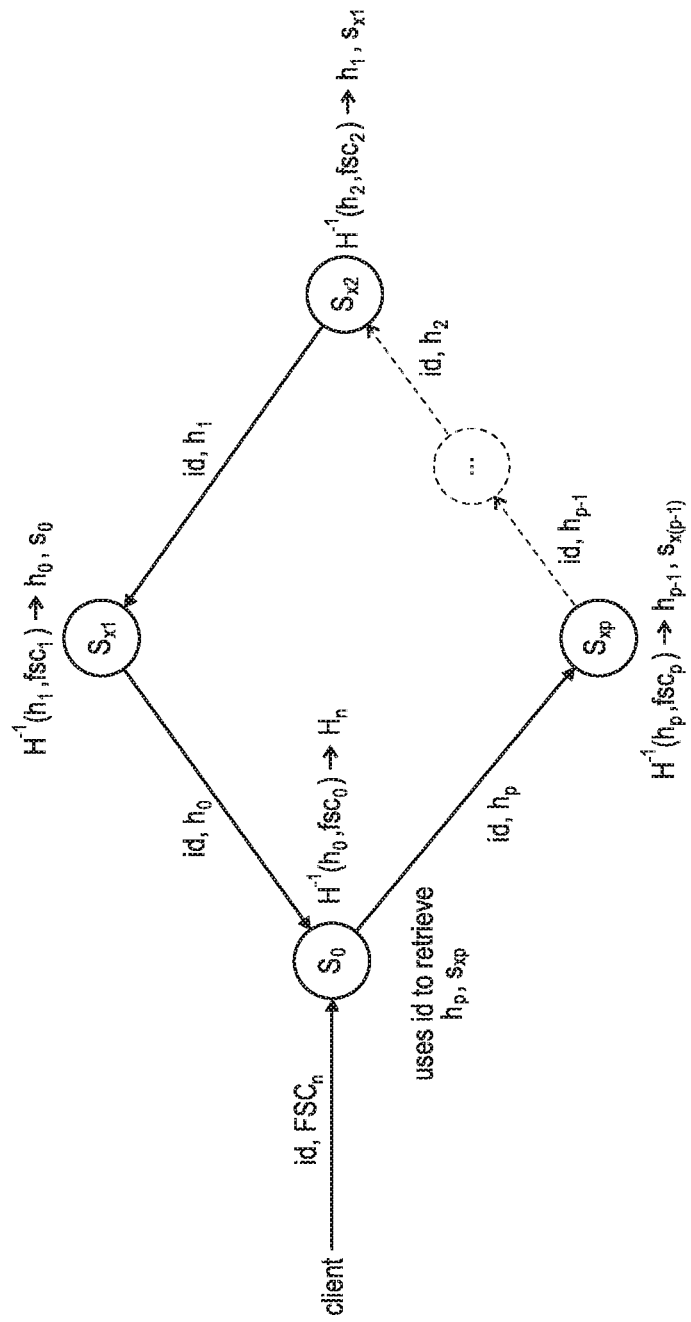

The invention will be better understood on reading the following detailed description of non-limiting exemplary embodiments thereof and on examining the appended drawings in which:

FIG. 1a, previously described, illustrates a general framework for the registration of a client on a server using a state-of-the-art method;

FIG. 1b, previously described, illustrates a general framework for the authentication of a client on a server using a state-of-the-art method;

FIG. 2, previously described, is a hashing process of an input sequence using the SHA-3 function;

FIG. 3, previously described, illustrates the generation of a security key using a modified SHA-3 function;

FIG. 4 schematically represents a registration of a client on a server, according to the invention;

FIG. 5 schematically illustrates an authentication of a client to a server according to the invention;

FIG. 6 schematically represents an embodiment of the invention;

FIGS. 7a and 7b schematically illustrate another embodiment of the invention;

FIG. 8 is an analogous view of FIG. 6 representing a third embodiment of the invention;

FIGS. 9 and 10 schematically illustrate a fourth embodiment of the 30 invention; and FIGS. 11 and 12 schematically represents an example where several servers are used at the registration step and at the authentication step respectively.

FIG. 4 depicts the steps of a registration phase of a client on a server, necessary and prior to any connection to that server.

A secured connection is preferably established between the client and the server, as for example a SSL or TLS connection ("Secure Sockets Layer" or "Transport Layer Security").

First and foremost, the client chooses an identifier ID whose availability is checked by the server. If the ID does not already exist in the server's database, registration is allowed. Then, the client gets a disposable random variable $RAND_0$ that is also possessed by the server. The client concatenates this variable to a password PWD and an initialization sequence $ISC_{init}$ and hashes the result of the concatenation to obtain the sequence $ISC_0$. This sequence is then concatenated to the random variable $RAND_0$ and hashed by a modified hash function to give the hashed word $H_0$ and the backhash $FSC_0$. At the registration phase, only the hashed word $H_0$ is sent to the server that stores it in a memory along with the associated identifier ID.

The memory may be an internal memory of the server or a remote one.

At the end of the registration phase, the client possesses $RAND_0$ and $ISC_{init}$ and knows his/her/its identifier ID and password PWD, while the server possesses $RAND_0$, ID and $H_0$ and knows nothing.

It is worth noting that, at the registration phase, both client and server do not consume huge computation resources, assuming that the hash function is a Keccak-type one.

In FIG. 5, steps of an authentication phase of a client to a server are schematically represented. For genericity purposes, the random variable noted $RAND_0$ at registration phase on previous figure is noted $RAND_n$ in this figure.

First, the client requests a connection to the server by transmitting his/her/its identifier ID. The server then checks its existence to allow continuation of the authentication process, if appropriate.

Possessing $RAND_n$ and $ISC_{init}$, and knowing his/her/its password PWD, the client is able to compute $ISC_n$, like he/she did at registering. Also, as was done at registration phase, the client hashes the concatenation of $ISC_n$ and $RAND_n$ to obtain the couple $(H_n, FSC_n)$.

The backhash information $FSC_n$ can be now transmitted to the server that possesses the hashed word $H_n$, since the end of registration phase. By applying an inverse hash function to said couple, the server can reconstruct the random variable $RAND_n$ used by the client, and compare it to the one it possesses. The comparison should match if the client has entered the right password.

At this step, the server can get from the client a new proof of authentication associated with a new hashed word $H_{n+1}$ computed from a new random variable $RAND_{n+1}$ and possibly a new password PWD in case the client wants to change his/her/its password for the next connection session.

Such protocol offers the option of a one-time password. And as long as the password is entangled with a nonce random variable and a sequence ISC, weak passwords, as for example «azerty», «12345» or «00000», may be authorized and used without any risks, provided the random variable is kept secret.

It should be noted that the most resource-consuming computation in the authentication method according to the invention is the algebraic solving of hash function. This computation is achieved by the server. So, implementation of such method on the client is rather cheap and simple, hence allowing to use the authentication process on low-power objects or sensors or connected objects e.g. cameras and remote actuators.

For instance, in a remote control of opening/turning on (a car, a door, etc.), the identifier ID is a unique number that is factory set, having 128 bits. The password, a value of 256 bits, may be either factory set, chosen or generated by the user or even derived from a biometric measure like a digital print, iris of the eye, etc.

In case the disposable random variable is generated from the backhash, the short data may be not used or may represent a control identifier (opening/closing, turning on/off, etc.).

In various sensors such as motion/smoke/flood detectors and measurement tools such as electric/water meters, the identifier ID and the password are also the same as for a remote control of opening/turning on, but in case the disposable random variable is generated from the backhash, the short data is directly measured by the sensor (intensity, meter value, etc.).

The authentication method according to the invention requires generating a different random variable whenever a registration or a connection is requested. This constraint mitigates replay attacks and also prevents an observer from the ability to determine whether the password has changed or not between two connections.

There are different ways allowing the client and the server to share possession of the disposable random variable.

Since it is not a confidential data, the random variable could be exchanged in plaintext between the client and the server, as shown in the embodiment of FIG. 6.

The client can transmit to the server the random variable along with the hashed word, and the server can transmit to the client the random variable with the identifier acknowledgment at the beginning of the authentication phase.

In the embodiment illustrated in FIGS. 7a and 7b, generation of the random variable is delegated to a dedicated server named "Cryptonid server".

As shown in FIG. 7a, at registration phase, the client transmits his/her/its identifier and the server's identity to the "Cryptonid server". Then, this one stores these pieces of information with a random variable that it generates and transmits to the client to enable him/her to compute the hashed word.

Later during the authentication phase, and just after receiving the backhash, the server transmits its identity and the client's identifier to the "Cryptonid server" as can be seen in FIG. 7b. The dedicated server then communicates the random variable.

The random variable may also be generated and shared via a specific device, as shown in the embodiment of FIG. 8. This device is in possession of both client and server and could be physical, for example a chip card like in SecurID technology, or software-based for instance, a smartphone or a computer application, etc.

FIG. 9 schematically depicts another embodiment of the invention where the disposable random variable is computed from the backhash of previous connection. This computation is done on both sides: the client's and the server's. Generating the random variable this way, independently of any external service/device, ensures that the same value of random variable cannot be reused and permits to authenticate the server to the client, as well.

FIG. 10 schematically represents a scenario of mutual authentication between the client and the server. After initiating a secure connection, the value of the random variable $RAND_n$ is communicated to both parties by a trusted entity. Still while having a secure connection, the client transmits to the server the hashed word $H_n$, computed on the basis of the random variable $RAND_n$ and a short data $d_n$ that could be 256 bits long.

Then, not necessarily with a secure connection, the client sends the backhash $F_n$ to the server that will be able to inverse the hash function in order to check the correspondence of random variables. If the random variable $R'_n$ resulting from the inversion is equal to the one stored, the server authenticates the client.

Thereafter, the server calculates the random variable $R'_{n+1}$ to be used for the next connection, on the basis of the backhash $F_n$. Its hashed value $h(R'_{n+1})$ is then transmitted to the client.

From its side, the client also computes the same way the next random variable $R_{n+1}$. If $h(R_{n+1})=h(R'_{n+1})$, the client validates the server's authentication and computes the next hashed word $H_{n+1}$ using $R_{n+1}$, $d_{n+1}$ and possibly another password.

The server then stores the hashed word $H_{n+1}$ received from the client, and calculates $h(H_{n+1}', R_{n+1})$ and sends it to the client, $H_{n+1}'$ being the hashed word it should **have recorded and that should correspond to $_{n+1}$ received.

The client validates recording of last hashed word if $h(H_{n+1}', R_{n+1})=h(H_{n+1}, R_{n+1})$. After that, next connection can be initiated; otherwise, if current connection is interrupted at any step, authentication process is reinitiated from the beginning.

These validation steps are useful to prevent Man in the Middle attacks.

FIGS. 11 and 12 represent an embodiment where several servers $s_0, \ldots, s_{xp}$ are involved at the registration step and at the authentication step respectively.

At registration step, the first server $s_0$ does not store the digest value $h_0$ but only stores the backhash $fsc_0$ resulting from the computation of $H(H_n, s_0)$, $s_0$ being a unique identifier of this server. The digest $h_0$ is sent to the next server $s_{x1}$. The destination server identifier is chosen using the digest value, so it is unpredictable without knowing all the information the first server knows about the user identity. Then, the next server proceeds the same way constructing a cycle that ends by sending the last hash and server identifier $(h_p, s_{xp})$ to the first server $s_0$.

At authentication step, the first server $s_0$ sends back the hash to the last server $s_{xp}$ which computes the previous hash and server identifier based on the backhash information $fsc_p$ it stored at registration step, and so on until the digest $h_0$ returns back to the first server that can verify the user identity.

The invention is not limited to the examples that have just been described. In particular, features from the embodiments illustrated may be combined within embodiments that are not illustrated.

Other algebraic solving than SATisfiability solving may be used, as for example automated reasoning techniques, meta-heuristics, finite algebra solving techniques, or Gröbner bases.

The method for authentication according to the invention and as defined above can be used in order to avoid the circulation of plaintext passwords on a network. The invention is not restricted to authentication on an information system but may be used in a lot of different applications, as for example in biometrics, internet of things, online transactions, locks, open/close control, turning on/off of devices, transmission of commands needing to be secured, etc., and wherever an authentication is required, demanding a high level of security.

The expression "comprising a" or "including a" must be understood as being synonymous with "comprising at least one" or "including at least one", unless specified otherwise.

The invention claimed is:

1. A method of authenticating a client to a server, the client having beforehand registered on the server by storing therein a valid identifier and a hashed word generated by applying a hash function to a disposable random variable possessed known by both the client and the server and concatenated with a sequence resulting from hashing the concatenation of a password known from the client, said disposable random variable and an initialization sequence possessed by the client, comprising:
   a. the client requesting a connection session to the server by transmitting their identifier;
   b. the server checking the existence of the identifier and allowing the client to continue the authentication process;
   c. the client transmitting a backhash obtained by a modified hash function configured to conserve all bits of a last internal state computed from input data of said hash function;
   d. the server applying to the concatenation of the hashed word and the backhash an inverse hash function obtained by algebraically solving said hash function;
   e. the server comparing the result of the inversion to the disposable random variable it possesses or knows; and
   f. when there is a match in the comparison of previous step e, authentication is successful for this connection session and the client is allowed to store on the server a new hashed word corresponding to a different random variable and a possibly different password for a next connection session; otherwise, authentication fails.

2. The method according to claim 1, wherein the hash function is a SHA-3 hash function.

3. The method according to claim 1, wherein the algebraic solving of the hash function is a SATisfiability solving.

4. The method according to claim 1, wherein in addition to being concatenated with the sequence, the disposable random variable is concatenated with a padding word in order to reach a predefined capacity of input data of the hash function.

5. The method according to claim 1, wherein in addition to being concatenated with the initialization sequence and the disposable random variable, the password is concatenated with a padding word in order to reach a predefined capacity of input data of the hash function.

6. The method according to claim 1, wherein the client and the server exchange the disposable random variable in plaintext.

7. The method according to claim 1, wherein a dedicated server generates the disposable random variable and transmits it to the client and the server.

8. The method according to claim 1, wherein the disposable random variable is generated by a specific device owned by both the client and the server.

9. The method according to claim 1, wherein the disposable random variable for a current connection is generated from the backhash of the immediately previous connection.

10. The method according to claim 1, wherein in addition to being concatenated with the sequence, the disposable random variable is concatenated with a short data, method further comprising:
  when there is a match in the comparison of step e, the client's identity and the short data are validated by the server which computes from the backhash the next disposable random variable and sends its hashed value to the client;
  the client computes the same way the next disposable random variable and compares its hashed value to the one received by the server;
  when there is a match in the comparison of previous step, the server is authenticated to the client, otherwise authentication fails;
  when the server's authentication is successful, the client can store on the server a new hashed word corresponding to the next disposable random variable and a possibly different password for the next connection session;
  the server hashes the concatenation of the next disposable random variable and the corresponding hashed word, and sends it to the client;
  the client performs the same hashing operation and compares the obtained result with that sent by the server; and
  when there is a match in the comparison of previous step, the client validates storing of the new hashed word by the server.

11. The method according to claim 1, wherein step d is performed on at least two servers, each of them partially carrying out algebraic solving of the hash function.

12. A non-transitory computer readable medium comprising a computer program instructions that can be read by a client, these instructions controlling the client's authentication to a server on which is stored a valid identifier for the client and a hashed word generated by applying a hash function to a disposable random variable possessed or known by both the client and the server and concatenated with a sequence resulting from hashing the concatenation of a password known from the client, said disposable random variable and an initialization sequence possessed by the client, said instructions comprising:
  requesting a connection session to the server by transmitting the identifier and waiting for the server's acknowledgment;
  transmitting to the server a backhash obtained by a modified hash function configured to conserve all bits of a last internal state computed from input data of said hash function; and
  when authentication is allowed for this connection session, storing on the server a new hashed word corresponding to a different random variable and a possibly different password for a next connection session.

13. A non-transitory computer readable medium comprising a computer program instructions that can be read by a server, these instructions controlling a client's authentication to the server on which is stored a valid identifier for the client and a hashed word generated by applying a hash function to a disposable random variable possessed or known by both the client and the server and concatenated with a sequence resulting from hashing the concatenation of a password known from the client, said disposable random variable and an initialization sequence possessed by the client, said instructions comprising:
  allowing a connection session to the client when a right identifier is transmitted by the client after their connection request;
  waiting to receive from the client a backhash obtained by a modified hash function configured to conserve all bits of a last internal state computed from input data of said hash function;
  applying the concatenation of the hashed word and the backhash to an inverse hash function obtained by algebraically solving said hash function;
  comparing the result of the inversion to the disposable random variable possessed or known by the server; and
  when comparison matches, allowing authentication for this connection session, and allowing to store a new hashed word corresponding to a different random variable for a next connection session; otherwise rejecting authentication.

14. A non-transitory computer readable medium comprising a computer program instructions that can be read by both a client and a server, these instructions controlling the client's authentication to the server on which is stored a valid identifier and a hashed word generated by applying a hash function to a disposable random variable possessed or known by both the client and the server and concatenated with a sequence resulting from hashing the concatenation of a password known from the client, said disposable random variable and an initialization sequence possessed by the client, said instructions comprising:
  a. the client requesting a connection session to the server by transmitting their identifier;
  b. the server checking the existence of the identifier and allowing the client to continue the authentication process;
  c. the client transmitting to the server a backhash obtained by a modified hash function configured to conserve all bits of a last internal state computed from input data of said hash function;
  d. the server applying to the concatenation of the hashed word and the backhash an inverse hash function obtained by algebraically solving said hash function;
  e. the server comparing the result of the inversion to the disposable random variable it possesses/knows; and
  f. when there is a match in the comparison of previous step e, authentication is successful for this connection session and the client is allowed to store on the server a new hashed word corresponding to a different random variable and a possibly different password for a next connection session; otherwise, authentication fails.

* * * * *